US006944139B1

(12) United States Patent
Campanella

(10) Patent No.: US 6,944,139 B1
(45) Date of Patent: Sep. 13, 2005

(54) DIGITAL BROADCAST SYSTEM USING SATELLITE DIRECT BROADCAST AND TERRESTRIAL REPEATER

(75) Inventor: S. Joseph Campanella, Gaithersburg, MD (US)

(73) Assignee: WorldSpace Management Corporation, Washington, DC (US)

( * ) Notice: Subject to any disclaimer, the term of this patent is extended or adjusted under 35 U.S.C. 154(b) by 0 days.

(21) Appl. No.: 09/647,007

(22) PCT Filed: Jul. 10, 1998

(86) PCT No.: PCT/US98/14280

§ 371 (c)(1),
(2), (4) Date: Sep. 26, 2000

(87) PCT Pub. No.: WO99/49602

PCT Pub. Date: Sep. 30, 1999

Related U.S. Application Data

(60) Provisional application No. 60/079,591, filed on Mar. 27, 1998.

(51) Int. Cl.⁷ ............................................. H04B 7/155
(52) U.S. Cl. .................... 370/315; 370/480; 455/3.02; 455/17
(58) Field of Search ................................ 370/315, 316, 370/480, 481, 485; 455/3.01, 3.02, 3.06, 455/11.1, 12.1, 7, 16, 17, 427, 430, 118

(56) References Cited

U.S. PATENT DOCUMENTS

| | | | |
|---|---|---|---|
| 4,385,381 A | 5/1983 | Alexis | 370/69.1 |
| 4,506,383 A * | 3/1985 | McGann | 455/17 |
| 4,881,241 A | 11/1989 | Pommier et al. | 375/38 |
| 4,901,307 A | 2/1990 | Gilhousen et al. | 370/18 |
| 5,081,703 A * | 1/1992 | Lee | 455/11.1 |
| 5,191,576 A | 3/1993 | Pommier et al. | 370/18 |
| 5,228,025 A | 7/1993 | Le Floch et al. | 370/20 |
| 5,283,780 A | 2/1994 | Schuchman et al. | 370/50 |
| 5,291,289 A * | 3/1994 | Hulyalkar et al. | 348/723 |
| 5,303,393 A | 4/1994 | Noreen et al. | 455/3.2 |
| 5,319,673 A | 6/1994 | Briskman | 375/1 |
| 5,450,448 A | 9/1995 | Sheynblat | 375/346 |
| 5,450,456 A | 9/1995 | Mueller | 375/224 |

(Continued)

FOREIGN PATENT DOCUMENTS

| | | | |
|---|---|---|---|
| CA | 2209165 | 1/1998 | H04B 1/69 |

OTHER PUBLICATIONS

Layer, David H., "Digital Radio Takes to the Road", *IEEE Spectrum*, Jul. 2001, pp. 40-46.

(Continued)

*Primary Examiner*—Min Jung
(74) *Attorney, Agent, or Firm*—Roylance, Abrams, Berdo & Goodman, L.L.P.

(57) ABSTRACT

A digital broadcast system is provided which uses a satellite direct radio broadcast system having different downlink modulation options in combination with a terrestrial repeater network employing different re-broadcasting modulation options to achieve high availability reception by mobile radios (14), static radios and portable radios (14) in urban areas, suburban metropolitan areas, and rural areas, including geographically open areas and geographic areas characterized by high terrain elevations. Two-arm and three-arm receivers are provided which each comprise a combined architecture for receiving both satellite and terrestrial signals, and for maximum likelihood combining of received signals for diversity purposes. A terrestrial repeater is provided for reformatting a TDM satellite signal as a multicarrier modulated terrestrial signal. Configurations for indoor and outdoor terrestrial repeaters are also provided.

26 Claims, 10 Drawing Sheets

U.S. PATENT DOCUMENTS

| | | | | |
|---|---|---|---|---|
| 5,454,009 | A | | 9/1995 | Fruit et al. .................. 375/202 |
| 5,485,485 | A | * | 1/1996 | Briskman et al. ........... 375/130 |
| 5,550,812 | A | | 8/1996 | Philips ........................ 370/19 |
| 5,574,970 | A | | 11/1996 | Linquist et al. ............ 455/13.1 |
| 5,592,471 | A | | 1/1997 | Briskman .................. 455/52.3 |
| 5,613,194 | A | | 3/1997 | Olds et al. ................. 455/12.1 |
| 5,636,246 | A | | 6/1997 | Tzannes et al. ............. 375/260 |
| 5,640,386 | A | * | 6/1997 | Wiedeman .................. 370/320 |
| 5,659,353 | A | | 8/1997 | Kostreski et al. ............ 348/21 |
| 5,726,980 | A | | 3/1998 | Rickard ...................... 370/293 |
| 5,784,418 | A | * | 7/1998 | Sykes et al. ................ 375/347 |
| 5,794,138 | A | | 8/1998 | Briskman ................... 455/344 |
| 5,848,060 | A | * | 12/1998 | Dent ........................... 370/281 |
| 5,864,579 | A | | 1/1999 | Briskman ................... 375/200 |
| 5,930,708 | A | * | 7/1999 | Stewart et al. .............. 455/428 |
| 5,953,311 | A | | 9/1999 | Davies et al. ................ 370/210 |
| 5,970,085 | A | * | 10/1999 | Yi ............................... 370/342 |
| 6,061,387 | A | * | 5/2000 | Yi ............................... 375/142 |
| 6,233,463 | B1 | * | 5/2001 | Wiedeman et al. ....... 455/552.1 |
| 6,249,514 | B1 | * | 6/2001 | Campanella ................ 370/316 |
| 6,404,775 | B1 | * | 6/2002 | Leslie et al. ................. 370/466 |

OTHER PUBLICATIONS

Hoeher, P. et al., "Helicopter Emulation of Archimedes/Mediastar Satellite DAB Transmission to Mobile Receivers", International Journal of Satellite Communications, vol. 15, pp. 35-43 (1997).

Tuisel, U. et al., "Carrier-Recovery for Multicarrier-Transmissin Over Mobile Radio Channels", International Conference on Acoustics, Speech and Signal Processing, ICASSPGE, San Francisco, 1992, pp. 677-680.

F.C.C. Application of Satellite CD Radio, Inc. for Private CD Quality Satellite Sound Broadcasting System, May 18, 1990.

Terrestrial and Satellite Digital Sound Broadcasting to Vehicular Portable and Fixed Receivers in the VHF/UHF Bands, International Telecommunication Union, Radio Communication Bureau, Geneva, 1995, pp. 18-34, 48-49, 87-93, 118, 162, 168-172, 183, Annex C, Table of Contents and Description of Digital System B.

Principles for the Guidance of EBU Members for WARC-92 Broadcasting-Satellite Service, European Broadcasting Union, Feb. 1991 Draft SPB 483-E, pp. 1-75.

Le Floch et al., "Digital Sound Broadcasting to Mobile Receivers", IEEE, Transactions on Consumer Electronics, Aug. 1989, vol. 35, No. 3, pp. 493-503.

"Proceedings from Second International Symposium on Digital Audio Broadcasting: The Sound of 2000", Toronto, Canada, Mar. 14-17, 1994, vol. I, pp. 158-181 and vol. II, pp. 63-108 and pp. 240-248.

Annex C to ITU-R Special Publication on Terrestrial and Satellite Digital Sound Broadcasting to Vehicular Portable and Fixed Receivers in the VHF/UHF Bands on "Digital System B", Nov. 1, 1994.

Introduction of Satellite in Complimentary Terrestrial Digital Sound Broadcasting in the WARC-92 Frequency Allocations, International Telecommunication Union, Document 10/30-E, Feb. 22, 1995, pp. 1-17.

Advanced Digital Techniques for UHF Satellite Sound Broadcasting: Collected Papers on Concepts for Sound Broadcasting Into the 21$^{st}$ Century, European Broadcasting Union, Extracted from EBU Document SPB 442, Jan. 1998, pp. 11-69.

"Mixed Satellite/Terrestrial Sound Broadcasting Service: Effect of a Co-Channel Satellite Service on a Terrestrial DSB Coverage", International Telecommunications Unit, Radio Communications Study Group, Document 10B-CAN-6, Oct. 8, 1993, pp. 1-8.

The Eurcka 147 Project, Digital Audio Broadcasting System, DAB Project Office, Germany, pp. 1-11.

De Gaudenzi, R., "Analysis of an Advanced Satellite Digital Audio Broadcasting System and Complementary Terrestrial Gap-Filler Single Frequency Network", IEEE Transactions on Vehicular Technology, vol. 43, No. 2, May 1994, pp. 194-210.

Linnartz, Jean-Paul M.G. et al., "Wireless Communication", copyrighted 1995.

Zheng, H. et al., "Subband Coded Image Transmitting Over Noisy Channels Using Multicarrier Modulation", Technical Research Report T.R. 98-20, Institute for Systems Research.

Miller, John E., "Application of Coding and Diversity Coding to UHF Satellite Sound Broadcasting Systems", IEEE, pp. 465-475, copyright 1988.

* cited by examiner

DIGITAL BROADCAST SYSTEM USING SATELLITE DIRECT BROADCAST AND TERRESTRIAL REPEATER This application claims benefit of provisional application No. 60/079,591 filed Mar. 27, 1998.

FIELD OF INVENTION

A digital broadcast system is provided which uses a satellite direct radio broadcast system having different downlink options in combination with a terrestrial repeater network employing different re-broadcasting options to achieve high availability reception by mobile radios, static radios and portable radios in urban areas, suburban metropolitan areas, rural areas, including geographically open areas and geographic areas characterized by terrain having high elevations.

BACKGROUND OF THE INVENTION

Receivers in existing systems which provide digital audio radio service (DARS) have been radically affected by multipath effects which create severe degradations in signal quality, such as signal fading and inter-symbol interference (ISI). Fading effects on broadcast channels to receivers can be sensitive to frequency, particularly in an urban environment or geographic areas with high elevations where blockage of line of sight (LOS) signals from satellites is most prevalent. Locations directly beneath a satellite (hereinafter referred to as the sub-satellite point) inherently have the highest elevation angles, while locations that depart from the sub-satellite point inherently have decreasing elevation angles and, accordingly, an increase of the earth center angle subtended between the sub-satellite point and the reception location. Locations that are near the sub-satellite point typically enjoy virtually unblocked LOS reception. Thus, the need for terrestrial reinforcement of potentially blocked LOS signals is minimal. When the LOS elevation angle to the satellite becomes less than about 85 degrees, however, blockage by tall buildings or geological elevations (i.e., on the order of 30 meters) becomes significant. Terrestrial re-radiation for gap filling is needed to achieve satisfactory coverage for mobile radios, static radios, as well as portable radios. In areas where the heights of buildings or geological sites are relatively low (i.e., on the order of less than 10 meters), the blockage is not significant until the LOS elevation angle is lower than 75 degrees. Thus, at the mid-latitude and high latitude locations within the coverages of one or more broadcast satellites, terrestrial re-radiation is needed to achieve suitable radio reception. A need exists for fully satisfactory radio reception that combines satellite LOS transmission and terrestrial re-radiation of a satellite downlink signal waveform.

SUMMARY OF THE INVENTION

In accordance with one aspect of the present invention, a digital broadcast system (DBS) is provided which overcomes a number of disadvantages associated with existing broadcast systems and realizes a number of advantages. The DBS of the present invention comprises a TDM carrier satellite delivery system for digital audio broadcasts (DAB) and other digital information which is combined with a network of terrestrial repeaters for the re-radiation of satellite downlink signals toward radio receivers. The terrestrial repeaters are configured to employ multipath-tolerant modulation techniques.

In accordance with another aspect of the present invention, a satellite delivery system and a terrestrial repeater operate using different carrier frequencies. The terrestrial repeater employs multipath-tolerant modulation techniques.

In accordance with yet another aspect of the present invention, a satellite delivery system and a terrestrial repeater both employ multipath-tolerant modulation techniques and can be configured to use the same or different carrier frequencies, depending on the type of waveform used. The satellite delivery system preferably employs a TDM or code division multiple access (CDMA)-type waveform. The terrestrial repeater preferably employs a multipath-tolerant waveform such as CDMA, Adaptive Equalized TDM (AETDM), Coherent Frequency Hopping Adaptively Equalized TDM (CFHATDM) or Multiple Carrier Modulation (CM).

In accordance with still another aspect of the present invention, a single geostationary satellite transmits downlink signals which can be received by radio receivers in the LOS of the satellite signal, as well as by terrestrial repeaters. Each terrestrial repeater is configured to recover the digital baseband signal from the satellite signal and modulate the signal using multicarrier modulation (MCM) for retransmission toward radio receivers. Radio receivers are configured to receive both a quadrature phase shift keyed (QPSK) modulated TDM bit stream, as well as an MCM stream. Radio receivers are programmed to select a broadcast channel demodulated from the TDM bit stream and the MCM bit stream, and to select the broadcast channel recovered with the least errors using a diversity combiner.

In accordance with still yet another aspect of the present invention, a DBS is provided which comprises two geostationary satellites in combination with a network of terrestrial repeaters. The terrestrial repeaters are configured to process satellite downlink signals to achieve the baseband satellite signal and to modulate the signal using MCM. Radio receivers are configured to implement a diversity decision logic to select from among three diversity signals, including the two satellite signals and the MCM signal. Each radio receiver employs maximum likelihood combining of two LOS satellite signals with switch combining between the terrestrial re-radiated signal, or MCM signal, and the output of the maximum likelihood combiner.

In accordance with another aspect of the present invention, a broadcast channel may be selected from the three diversity signals by using maximum likelihood combining of all three signals, that is, early and late LOS satellite signals and the MCM signal from the terrestrial repeater.

BRIEF DESCRIPTION OF THE DRAWINGS

These and other features and advantages of the present invention will be more readily comprehended from the following detailed description when read in connection with the appended drawings, which form a part of this original disclosure, and wherein.

DETAILED DESCRIPTION OF THE PREFERRED EMBODIMENTS

Figure 1:
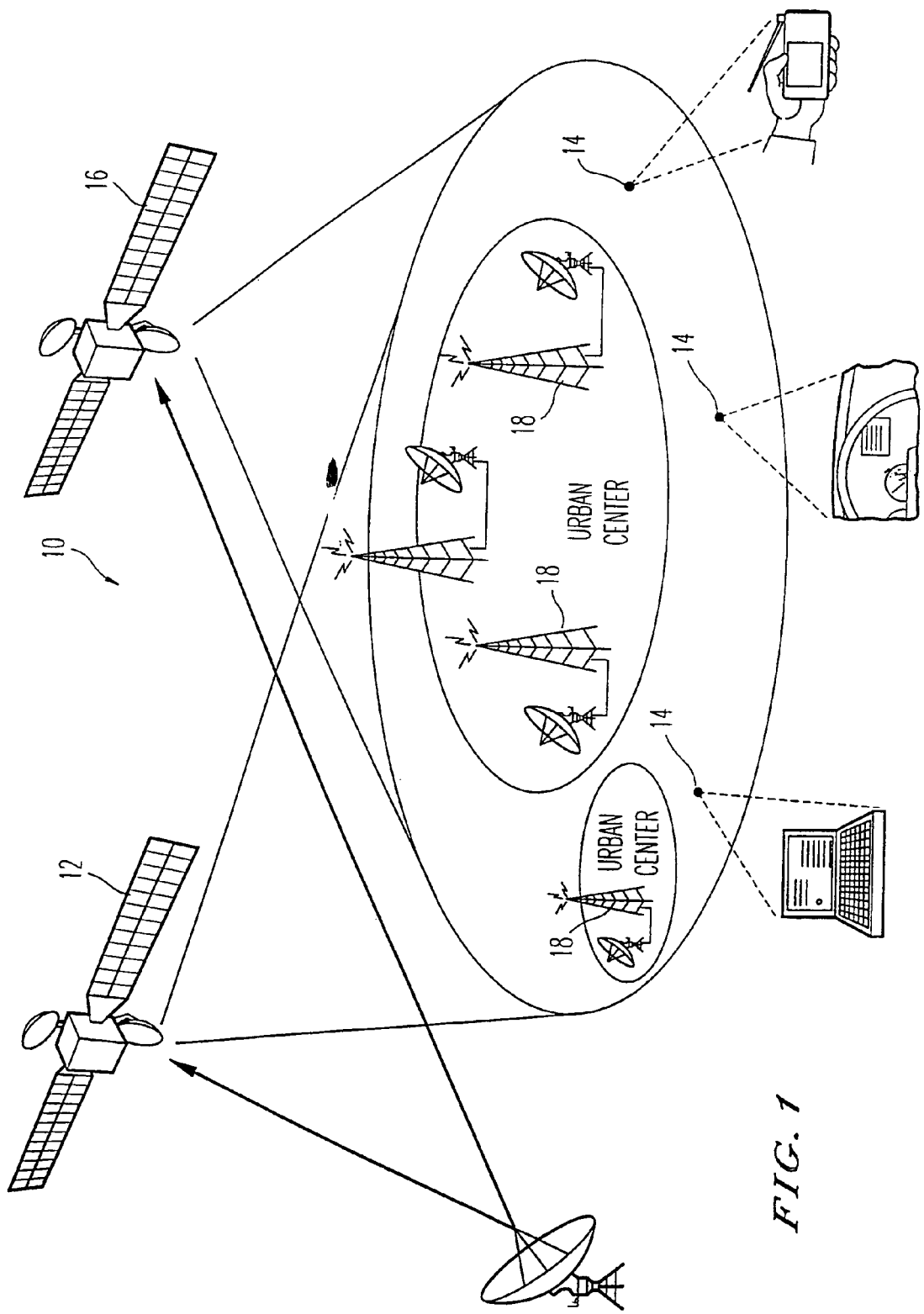
FIG. 1 depicts a digital broadcast system for transmitting satellite signals and terrestrial signals in accordance with an embodiment of the present invention.

FIG. 1 depicts a digital broadcast system (DBS) 10 comprising at least one geostationary satellite 12 for line of sight (LOS) satellite signal reception at radio receivers indicated generally at 14. Another geostationary satellite 16 at a different orbital position can be provided for time and/or spatial diversity purposes as discussed below in connection with FIGS. 6 and 7. The system 10 further comprises at least one terrestrial repeater 18 for retransmission of satellite signals in geographic areas 20 where LOS reception is obscured by tall buildings, hills and other obstructions. The radio receiver 14 is preferably configured for dual-mode operation to receive both satellite signals and terrestrial signals and to select one of the signals as the receiver output.

As stated previously, the present invention relates to a DBS 10 for optimized static, portable and mobile radio reception. In accordance with the present invention, the DBS 10 combines line-of-sight (LOS) reception of satellite waveforms that are optimized for satellite delivery with re-radiation of the LOS signal from the satellite 12 or 16 via one or more terrestrial repeaters 18. The terrestrial repeaters 18 use other waveforms which are optimized for terrestrial delivery where blockage of the satellite LOS signal occurs. LOS signal blockage caused by buildings, bridges, trees and other obstructions typically occurs in urban centers and suburban areas. Waveforms particularly suitable for LOS satellite transmission are Time Division Multiplex (TDM) and Code Division Multiple Access (CDMA). Multipath-tolerant waveforms particularly suitable for overcoming terrestrial multipath interference encountered in blocked urban areas are CDMA, Adaptive Equalized TDM (AETDM), Coherent Frequency Hopping Adaptively Equalized TDM (CFHATDM) and Multiple Carrier Modulation (MCM).

Frequency hopping is described in U.S. Pat. No. 5,283,780, to Schuchman et al, which is hereby incorporated herein by reference. When a terrestrial repeater 18 employs AETDM, radio receivers 14 are provided with an equalizer (not shown). For AETDM, a TDM bit stream is received from the satellite 12 or 16. The bit stream is converted into a new TDM bit stream into which training sequences are inserted by a process called puncturing. Puncturing replaces a small fraction of the TDM data bits with the training sequences. The number of bits punctured is so small that the errors thereby produced are correctable at the receiver by forward error correction. The new TDM bit stream is QPSK-modulated by the repeater onto a radio frequency (RF) carrier that is transmitted at high power into the multipath environment of a central city business district, for example. This transmitted signal is received by a receiver 14 equipped with an adaptive time domain equalizer. By using the training sequences, it can adjust the taps of an inverse multipath processor to cause the various multipath arrival components to add constructively. The signal thus reconstructed is next processed to recover the bits of the TDM stream with high accuracy. The forward error correction available in the receiver 14 corrects both the errors introduced by the puncturing and those caused by thermal noise and receiver impairments.

In accordance with another aspect of the present invention, the combination of a satellite-efficient LOS waveform and terrestrial multipath interference-tolerant waveform in a DBS system is the optimum means for achieving high availability reception by mobile radios, static radios and portable radios in urban areas, suburban areas and in rural areas. For example, in accordance with an embodiment of the present invention illustrated in FIGS. 2–9, an MCM signal is sent from a network of terrestrial repeaters 18 deployed to cover a blocked area with high reception availability. The signaling techniques described in connection with the present invention are applicable over the electromagnetic wave frequency range from 200 to 3000 MHz to facilitate the combination of LOS satellite radiation with terrestrial re-radiation of the signal received from the satellite 12 or 16.

Optimal satellite waveforms permit very efficient transformation of solar power, which is collected by the solar arrays of the satellites 12 and 16 into radiated radio frequency power. These waveforms are characterized by a low peak-to-average power ratio (i.e., crest factor), thereby permitting operation of high power amplifiers that feed the satellite earth-pointing antennas at or near the maximum power output and therefore the most efficient power output. A TDM waveform is particularly useful for permitting operation within a few tenths of a dB of maximum power output. A CDMA waveform that uses properly selected codes allows operation at approximately 2 to 4 dB below maximum power output. Because the MCM waveform is composed of the sum of hundreds of phase modulated sinusoids, as described below with reference to FIG. 3, the MCM waveform inherently possesses a high peak-to-average ratio. Consequently, a MCM waveform encounters significantly greater amplitude and phase intermodulation distortion in the satellite's high power amplifier. To achieve acceptable reception by an LOS satellite receiver, a MCM waveform is backed in the high power amplifier and allocated a receiver implementation impairment of at least 6 dB on the down-link budget, as compared with a quadrature phase shift keying (QPSK) TDM waveform. This translates to a 4-to-1 reduction in satellite power conversion, rendering the MCM waveform an unsuitable choice for satellite LOS delivery on a DBS 10. Regarding the AETDM and CFHATDM waveforms, these waveforms are specifically designated to combat terrestrial multipath and are not intended for, nor are they efficient, for satellite LOS delivery.

Regarding terrestrial reinforcement by re-radiation of the satellite LOS signal from a terrestrial repeater, for example, a TDM waveform is not suitable because its reception is severely impaired by multipath effects. Furthermore, some proposed systems which use CDMA waveforms for reinforcement repeat the same program signal using one CDMA channel code for LOS satellite delivery and another CDMA channel code for terrestrial re-radiated delivery on carriers that occupy the same frequency bandwidth. Reception is achieved by means of adaptive rake receivers. These proposed CDMA systems are disadvantageous because an annulus zone occurs in which reception is not possible between the region where the reinforcement signal can be received and the region where the satellite LOS signal can be received. Receivers 14 in the annulus are not able to receive the terrestrial re-radiated signal because the signal power level falls below a receiver threshold for that signal. These receivers 14 are also not able to receive the satellite LOS signal because there remains sufficient re-radiated signal to jam LOS satellite reception. Thus, these receivers 14 in the annulus must move far enough away from the zone of re-radiation to decrease the re-radiated signal power to below the threshold of jamming; otherwise, LOS satellite reception is not possible.

In accordance with one embodiment of the present invention, the CDMA waveform is adapted to make possible its use for simultaneous delivery via satellite LOS and via terrestrial re-radiation. The CDMA channel codes are assigned for each delivery to different RF carriers. The orthogonality thereby created permits the two signals (i.e., the satellite LOS signal and the terrestrial repeater signal) to be separated by RF/IF filtering in the radio receiver.

The identification of workable and unworkable waveform combinations for accomplishing terrestrial reinforcement of satellite LOS reception in accordance with the present invention are listed in the TABLE 1. More than one type of modulation or signal formatting method can be used with the satellite signal, as well as with the terrestrial repeater signal.

TABLE 1

| Satellite Waveform | Reinforcement Waveform | Recommended | Not Recommended | RF Carrier Spectra Are: |
|---|---|---|---|---|
| TDM | TDM | | X | Same or Different |
| TDM | AETDM | X | | Same or Different |
| TDM | MCM | X | | Different |
| TDM | CFHATDM | X | | Different |
| TDM | CDMA | X | | Different |
| CDMA | CDMA | X | | Different |
| CDMA | AETDM | X | | Different |
| CDMA | CHFATDM | X | | Different |
| CDMA | MCM | X | | Different |
| CDMA | ANY | | X | Same |
| AETDM | ANY | | X | Same or Different |
| CFHATDM | ANY | | X | Same of Different |
| MCM | ANY | | X | Same or Different |

AETDM waveforms can be satisfactorily implemented and operated in multipath environments characterized by signal propagation delays as long as 20 microseconds ($\mu$s). Care must be exercised to ensure that signal arrivals from distant repeaters 18 do not exceed this bound. The adaptively equalized re-radiated waveform can be received by radio receivers 14 designed to use the parent non-equalized TDM waveform when the former does not exhibit severe multipath. This compatibility prevents obsolescence of direct LOS non-equalized TDM radios when the AETDM re-radiation is turned on.

The CFHATDM waveform can be satisfactorily implemented and operated in multipath environments characterized by delays as long as 65 $\mu$s. Care must be exercised to ensure that signal arrivals from distant repeaters 18 do not exceed this bound. The waveform cannot be received by radio receivers 14 designed to use the parent non-equalized TDM waveform.

The MCM waveform can be satisfactorily implemented and operated in multipath environments characterized by delays as long as 65 $\mu$s. The maximum delay is affected by the guard time assignment given to the waveform's periodic symbol period assignment. Care must be exercised to ensure that signal arrivals from distant repeaters 18 do not exceed this bound. The waveform cannot be received by radio receivers 14 designed to use the parent non-equalized TDM waveform.

The CDMA waveform can be satisfactorily implemented and operated in multipath environments characterized by delays determined by the span of the time delays implemented in the rake paths at the receivers 14. Care must be exercised to ensure that all signal arrivals from distant repeaters 18, multipath reflections and different satellites do not exceed this bound. The waveform cannot be received by radio receivers 14 designed to use the parent non-equalized TDM waveform.

The satellite signals can be transmitted from one satellite 12 or 16 or from two satellites 12 and 16. Use of two geostationary satellites 12 and 16 sufficiently separated in their orbits creates diversity in the LOS elevation and azimuth angles to enhance signal reception availability. Also, time diversity achieved by repeating a satellite signal from a single satellite 12 or 16, or by transmitting a signal from two satellites 12 and 16 with the properly selected time difference, further enhances the reception availability.

In accordance with a preferred embodiment of the present invention, a waveform comprising multiple channel TDM with QPSK, Offset QPSK, Differential QPSK, Differentially Coded QPSK, or Minimum Shift Keyed (MSK) modulation is used for the transmission of signals from a satellite for LOS reception by a radio receiver 14. Terrestrial re-radiation is preferably implemented using an MCM waveform designed to carry a TDM bit stream of a capacity of up to 3.68 Mbit/s. MCM is preferably implemented which creates between 400 and 1200 multiple carriers by means of an Inverse Fast Fourier Transform as described below in connection with FIG. 3, resulting in a symbol period between 200 and 300 $\mu$s. A guard interval of between 55 to 65 microseconds is included in each symbol period. The MCM waveform is designed to accommodate Doppler carrier frequency shifts among multipath components occurring simultaneously. Puncturing is preferably used to eliminate bits or pairs of bits from the TDM bit stream to reduce the rate to a value of between 70% to 80% of the 3.68 Mbit/s rate. A special symbol is inserted between each of a selected number of FFT-generated symbols periods to provide a means to recover symbol period timing and carrier frequency synchronization. In the receiver 14, a Viterbi soft decision trellis decoder is preferably implemented to reestablish the bits or bit pairs punctured at the repeater 18, as well as all other bits transmitted, by use of an erasure technique. In this technique, the decoder simply ignores the bits in locations known to have been punctured at the repeater 18.

TDM carrier satellite delivery of the DBS 10 is discussed in U.S. patent application Ser. No. 08/971,049, filed Nov. 14, 1997, the entire subject matter of which is hereby incorporated herein by reference for all purposes. Briefly, with reference to FIG. 2, the broadcast segment 22 preferably includes encoding of a broadcast channel into a 3.68 Megabits per second (Mbps) time division multiplex (TCM) bit stream, as indicated in block 26. The TDM bit stream comprises 96 16 kilobits per second (kbps) prime rate channels and additional information for synchronization, demultiplexing, broadcast channel control and services. Broadcast channel encoding preferably involves MPEG audio coding, forward error correction (FEC) and multiplexing. The resulting TDM bit stream is modulated using quadrature phase shift keying (QPSK) modulation, as shown in block 28, prior to transmission via a satellite uplink 30.

TDM satellite delivery achieves the greatest satellite on-board payload efficiency possible in terms of the conversion of solar power to electromagnetic wave power. This is because single TDM carrier per tube operation permits each satellite traveling wave tube to operate at its saturated power output, which is its most efficient operating point. The TDM carrier in a typical application is designed to deliver 96 prime bit rate increments, each bearing 16 kbit/s, to small, economical radio receivers 14 located in the beams of the satellite 12 or 16. From one to eight prime rate increments are grouped to constitute a broadcast channel. A broadcast channel can be divided into a number of service channels for delivery of audio, video, data and multimedia.

The power density delivered to the earth by TDM carriers from satellites 12 and 16 can made very high and hence provide excellent LOS reception by radio receivers 14 in automobiles and trucks when traveling on open highways in the country side and in suburban areas. However, in urban areas where tall buildings abound, or in forests where tall towering damp foliage trees abound, LOS reception is blocked, thus inhibiting suitable operation of the receiver 14 for LOS reception. Attempting to overcome these conditions by raising the satellite power is both excessively expensive and technically impractical. Accordingly, a more practical alternative is to augment the direct LOS satellite reception by adding a network of terrestrial repeaters 18.

Concerning the nature of the blockage of LOS reception consider the following. Locations directly beneath the satellite 12 or 16 (i.e., the sub-satellite point) inherently have the highest elevation angles, while locations that depart from the sub-satellite point inherently have decreasing elevation angles and an increase of the earth center angle subtended between the sub-satellite location and the reception location. Receivers 14 at locations that are near the sub-satellite point are permitted virtually unblocked LOS reception and the need for terrestrial reinforcement is minimal. However, when the LOS elevation angle to the satellite becomes less than about 85 degrees, blockage by tall buildings (i.e., >30 m) becomes significant. Accordingly, terrestrial re-radiation for gap-filling is needed to achieve satisfactory coverage for mobile radio receivers. In areas where building heights are low (e.g., <10 m), blockages are not significant until the LOS elevation angle is lower than 75 degrees. At the mid-latitude and high latitude locations within the 6 degree beam width coverages of the satellites 12 and 16 terrestrial re-radiation of the TDM waveform is needed to achieve suitable mobile reception. Thus, fully satisfactory mobile reception requires a system that combines satellite LOS and terrestrial re-radiation of the satellite waveform.

The DBS 10 of the present invention re-radiates the LOS satellite signal from a multiplicity of terrestrial repeaters 18 which are judiciously spaced and deployed within the central part of a city, as well as in metropolitan areas and suburban areas, to achieve maximum coverage. This type of deployment is a recognized art for terrestrial digital audio broadcast (DAB) and cell telephone systems, and can be extended in accordance with the present invention to terrestrial re-radiation of the TDM satellite LOS signal. The deployment utilizes a mix of radiated power levels (EIRP) ranging from as little as 1 to 10 watts for short range fill-in repeaters 18 (out to 1 km radius) to as great as 100 to 10,000 watts for re-radiators or repeaters having wide area coverage (from 1 km to 10 km radius).

Two preferred embodiments for a DBS 10 having a satellite-LOS/terrestrial-re-radiation configuration are described below. The first embodiment involves one geostationary orbit (GSO) satellite 12 or 16 having a judiciously selected longitude along the GSO arc which operates in coordination with a network of the terrestrial repeaters 18. The second embodiment involves two satellites 12 and 16 having different judiciously spaced GSO longitudes to achieve space and time diversity.

Figure 2:
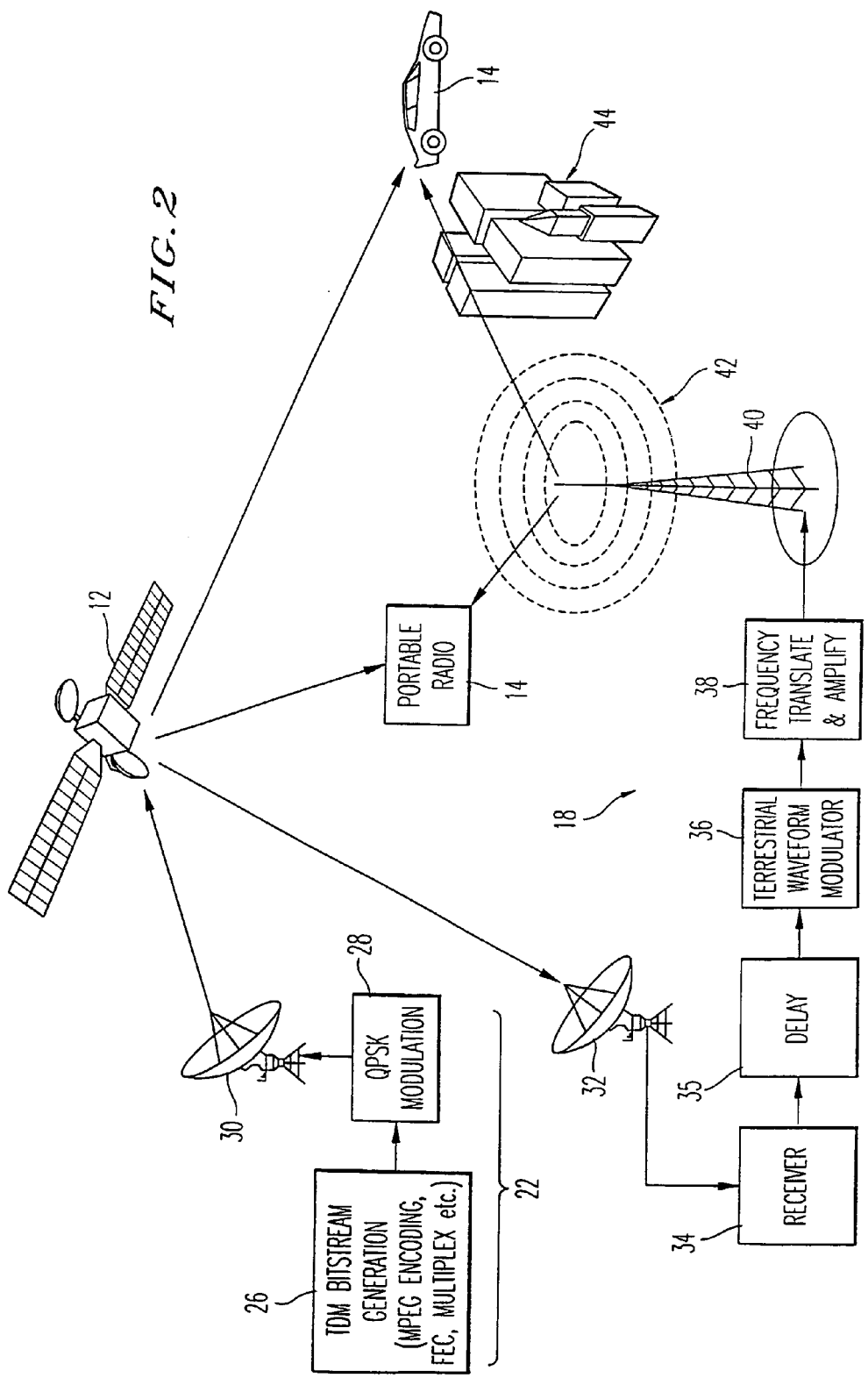
FIG. 2 is a diagram of a digital broadcast system comprising a satellite and a terrestrial repeater in accordance with an embodiment of the present invention.

The embodiment for a DBS 10 using one GSO satellite 12 with at least one terrestrial repeater 18 is shown in FIG. 2 for illustrative purposes. For each terrestrial repeater 18, the LOS satellite signal is received by an antenna 32 operating in conjunction with a radio receiver 34 to demodulate and recover the digital baseband signal from the signal radiated from the satellite 12. A delay block 35 delays the entire digital baseband signal by the amount of time diversity delay (if any) between transmissions from the satellites 12 and 16. The digital baseband signal is supplied to a terrestrial waveform modulator 36 that generates a waveform which is judiciously designed to make possible the recovery of the digital baseband signal after the waveform has been transmitted from the terrestrial repeater 18 and received by a radio receiver 14. The modulated waveform is then frequency translated to a carrier frequency and amplified, as indicated by block 38. The terrestrial re-radiated waveform is specifically chosen to withstand the dynamic multipath encountered over the terrestrial path between the transmitter antenna 40 and the receiver 14. This multipath is caused by reflections and diffractions from and around obstacles such as buildings 44 and terrain and from troposphere wavebending and reflections.

The antenna 32 is designed to have high gain (>10 dBi) toward the satellite 12, while achieving low gain in other directions such that the LOS signal is received with low interference and consequently very high quality (i.e. error rate $<10^{-9}$). The demodulator and other reception elements in the receiver 34 are those designed for the LOS radio receivers 14 used in the DBS 10 and described in the aforementioned application Ser. No. 08/971,049, filed Nov. 14, 1997. The radio receivers 18 are designed to receive the 3.68 Mbit/s QPSK modulated TDM bit stream. As stated previously, the digital baseband is preferably a 3.68 Mbit/s digital Waveform TDM bit stream that carries 96 16 kbit/s prime bit rate digital channels organized into broadcast channels, and side information needed to synchronize, demultiplex and control the broadcast channels and the services they bare. The terrestrial waveform modulator 36 and the waveform that it generates is designed to allow reception unimpeded by the multipath vagaries indicated at 42 of the terrestrial path as described previously. Possible multipath-tolerant waveforms are adaptive equalized TDM, adaptive equalized multiple carrier frequency hoppers with adaptive equalization, Fast Fourier Transform multiple carrier modulation and CDMA with rake receivers. The repeater 18 is equipped to assemble the multipath-tolerant waveform, to frequency convert the waveform to the desired re-radiator transmitter RF frequency at the selected power level via the RF translator 38, and to radiate the waveform from antenna 40. The antenna 40 is preferably configured to provide omni-directional or sector directional propagation in the horizontal plane and high directive toward the horizon. The net antenna gain is expected to range from 10 to 16 dBi. The antenna 40 can be located on top of a building and/or on a tower at a desired height. As previously mentioned, the radiated power level can range from 1 to 10,000 watts of EIRP depending on the application.

Figure 3:
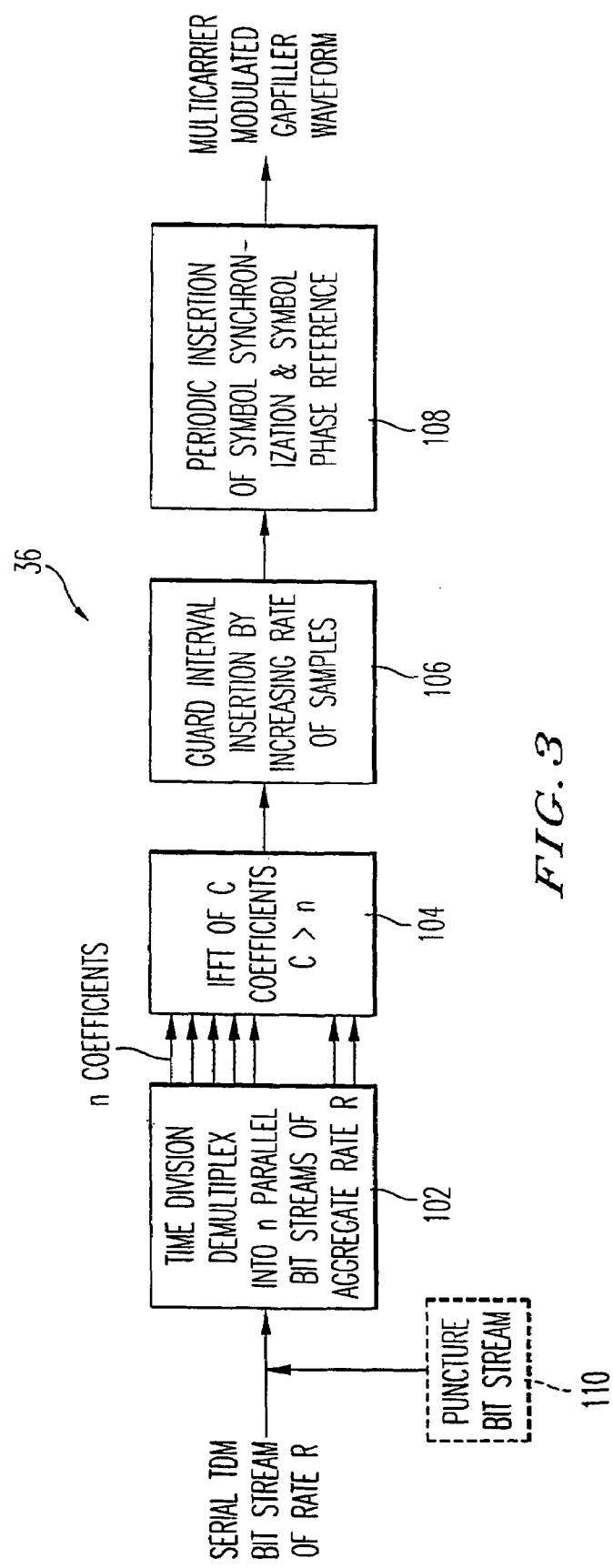
FIG. 3 is a schematic block diagram illustrating a generation of a multicarrier modulated (MCM) signal in accordance with an embodiment of the present invention.

A particularly desirable multipath-tolerant re-radiated waveform uses multicarrier modulation (MCM). The manner in which the waveform is generated is shown in FIG. 3. A digital stream such as the 3.68 Mbit/s TDM stream is time-domain-divided into a number of parallel paths (block 102), for example, 460 parallel paths with each parallel path carrying 8000 bits per second. The bits on each of these paths are paired into 2 bit symbols with one bit identified as the I (imaginary) component and the other as the Q (Real) component of a complex number. This creates a complex symbol rate of 4000 per second. These bits are fed as 460 parallel complex number frequency coefficient inputs to a Discrete Inverse Four-er Transform converter implemented using a 512 coefficient Inverse Fast Fourier Transform (IFFT) 104. It is well known in the current state of the art that the Fast Fourier Transform algorithm must operate with $2^n$ input and output coefficients where n is any integer. Thus, for n=9, $2^9$=512. Since the number of coefficients is 460, the remaining 52 missing input coefficients are set equal to zero. This is done by assigning 23 zero-valued coefficients at each the uppermost and lower most IFFT inputs, thus leaving the 460 center coefficients assigned to non-zero values. The output 104 of the IFFT is a set of 460 QPSK-modulated, orthogonal sine coefficients which constitute 460 narrow band orthogonal carriers, each supporting a symbol rate of 4000 per second and consequently having a symbol period of 250 µs. No carriers appear at the output of the IFFT 104 for the coefficients that are set equal to zero:

The IFFT multicarrier output 104 is further processed to create a guard interval 105 for the set of 460 complex symbol narrow band orthogonal carriers (block 106). It is assumed that a fraction f of a symbol period Ts is to be allocated to guard time. To do this the symbol duration must be reduced to a value Ts=(1−f)Ts. For the example considered above Ts=250 µs. If 25% of the symbol time is to be allocated guard time, then f=0.25 and Ts=187.5 µs. To do this, the symbol period output of the IFFT is stored in a memory every 250 µs and then played back in 187.5 µs. To fill the 250 us symbol interval, the first samples of the IFFT output are again played back during the 62.5 µs guard interval. This procedure causes an increase in the bandwidth of the multicarrier output by a multiplication of (1−f)−1. Thus, the bandwidth needed for the multicarrier modulator output is multiplied by 1.33 to a value of 4000×460×1.33= 2.453 MHz.

Finally, to complete the multicarrier modulator processing, a symbol 106 containing a synchronization symbol is introduced periodically, as indicated by block 108. This is done to provide the means for synchronizing a sampling window of 187.5 µs duration at the receiver 14 to the center of the group of multipath arrivals every 250 µs. Also, a phase reference symbol for differential reference coding of the symbol information is also added periodically. The synchronization and phase reference symbols are preferably introduced every 20 to 100 symbol periods depending on the design requirements.

An additional feature of the modulation design is to puncture the TDM digital bit stream, as indicated by phantom block 110, at the input to the modulator 36 to reduce the final bandwidth of the multicarrier waveform. Puncturing means selective, sparse elimination of real data bits from the data stream applied at the input to the IFFT 104. This can be done for a fraction of the bits of the stream in anticipation that the forward error correction scheme applied at the receiver 14 will simply treat the punctured bits as errors and correct them. This has the consequence of increasing the signal to noise ratio ($E_b/N_o$) for a desired reception BER objective by 1 to 3 dB, depending on the fraction of bits removed by the puncturing. The design for the punctured waveform proportionately reduces the bandwidth of the multicarrier modulation. For example, if the bit rate of the TDM stream is reduced by 75%, the bandwidth will also be reduced by 75%. For the example previously given, the bit rate is reduced to 2.76 Mbit/s and the multicarrier bandwidth to 1.84 MHz. Such bandwidth compression can be necessary in applications where the available frequency spectrum would otherwise be insufficient to carry the desired capacity.

Further details concerning the preferred multicarrier modulation techniques used herein can be found in International Application Nos. PCT/EP98/02167, PCT/EP98/ 02168, PCT/EP98/02169, PCT/EP98/02170 and PCT/EP98/ 02184, all filed on Apr. 14, 1998 by Fraunhofer-Gesellschaft zur Förderung.

It is to be understood that the terrestrial repeater described with reference to FIGS. 2 and 3 is used to recover a TDM satellite downlink signal, and to demodulate and reformat the TDM signal via baseband processing into a different waveform using or example, CDMA, AETDM, MCM or CHFATDM. It is to be understood, however, that the DBS 10 can comprise terrestrial repeaters 18 which are co-channel or non-co-channel repeaters. For example, terrestrial repeaters 18 can be provided which are co-channel gap-fillers which merely amplify and repeat a received satellite signal on the same carrier as the satellite signal. Alternatively, terrestrial repeaters can be provided which are non-co-channel gap-fillers which amplify and repeat a satellite signal on a different carrier frequency via frequency translation. In either case, baseband processing of the satellite signal is not performed at the repeater. These types of gap-fillers can be used, for example, indoors (FIG. 10) or along a roadway (FIG. 11).

Figure 4:
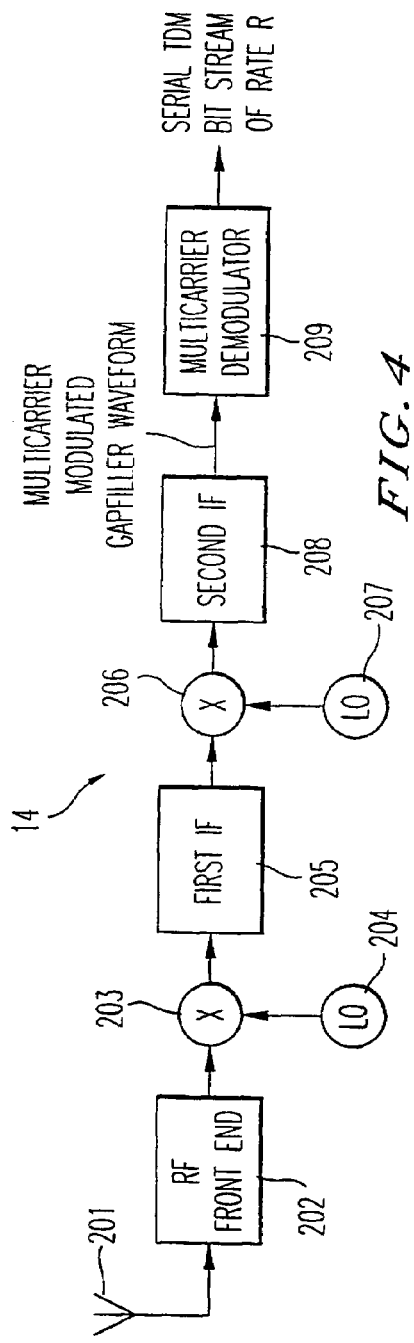
FIG. 4 is a schematic block diagram depicting a radio receiver arm configured to demodulate MCM signals in accordance with an embodiment of the present invention.
Figure 5:
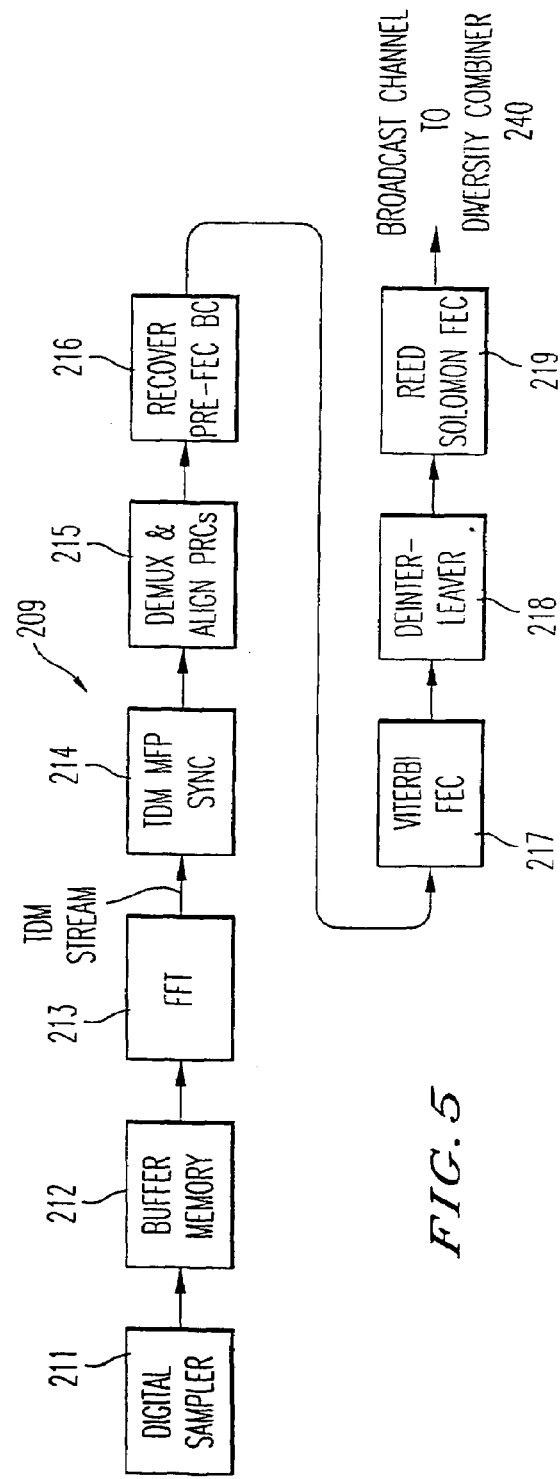
FIG. 5 is a block diagram illustrating MCM signal demodulation in accordance with an embodiment of the present invention.

At a radio receiver 14 shown in FIG. 4, the multicarrier modulated RF waveform is received by the antenna 201 operating in conjunction with a low noise RF front end 202, mixer 203, local oscillator 204, first intermediate frequency (IF) 205, second mixer 206, second local oscillator 207, second IF 208 to recover the multicarrier modulated carrier. A multicarrier demodulator 209 recovers the TDM digital baseband signal. To demodulate the multicarrier waveform, the received modulated signal is digitally sampled by a sampler 211, as shown in FIG. 5, at a rate equal to two of four times the bandwidth of the modulation. These samples are taken during a window of 187.5 µs duration which is optimally centered on the cluster of time dispersed multipath arrivals during each symbol period once every 250 µs. The samples are rate down converted by a buffer memory 212 to expand them to the 460 complex time domain samples in the original 250 μs duration window. These samples are then processed by an 512 coefficient FFT 213 to recover the bits of the TDM bit stream. The receiver 14 next synchronizes to the TDM masterframe frame preamble via unit 214, demultiplexes and aligns the prime rate bits via unit 215 and then recovers the bits of a selected broadcast channel via unit 216. These bits are then forward error corrected using concatenation of a soft decision Viterbi decoder 217, a de-interleaver 218, followed by a Reed Solomon decoder 219, to recover the broadcast channel (BC). This recovered BC is supplied as one input to a decision/combiner unit 240, as described below in connection with FIG. 6.

Figure 6:
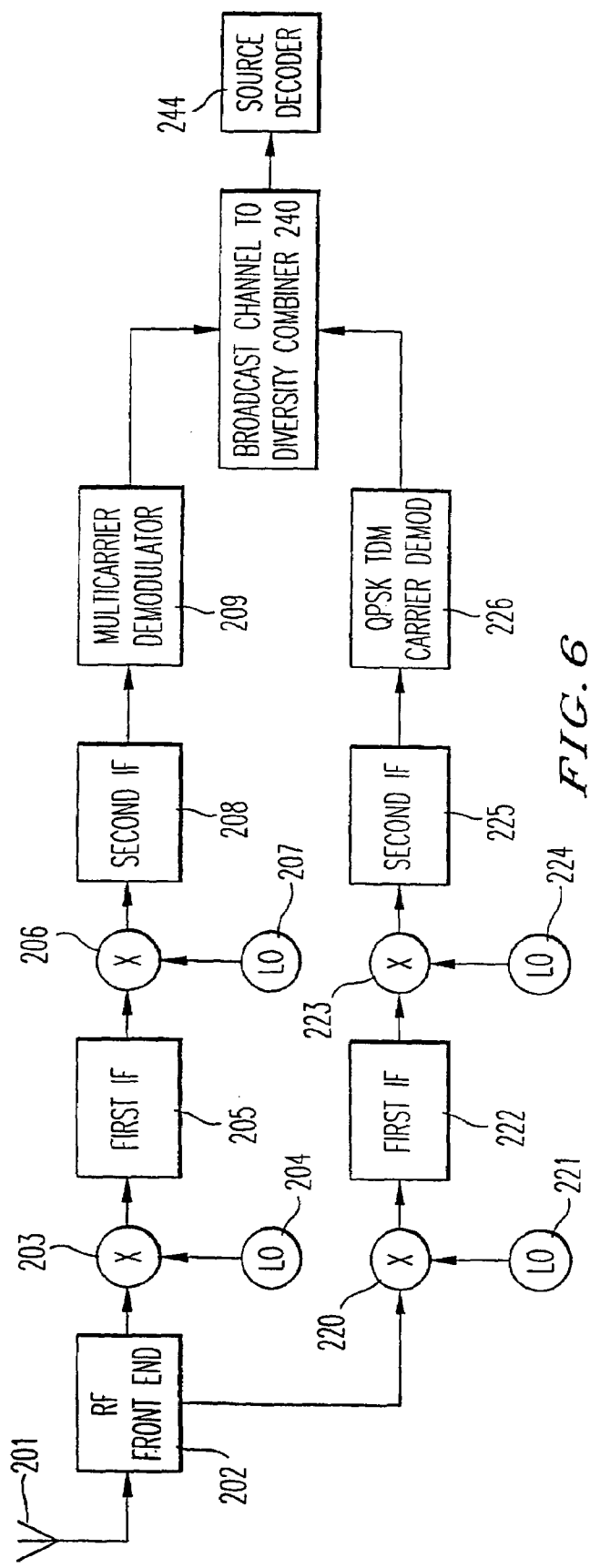
FIG. 6 is a schematic block diagram depicting a radio receiver arm configured to demodulate time division multiplexed (TDM) signals in accordance with an embodiment of the present invention.
Figure 7:
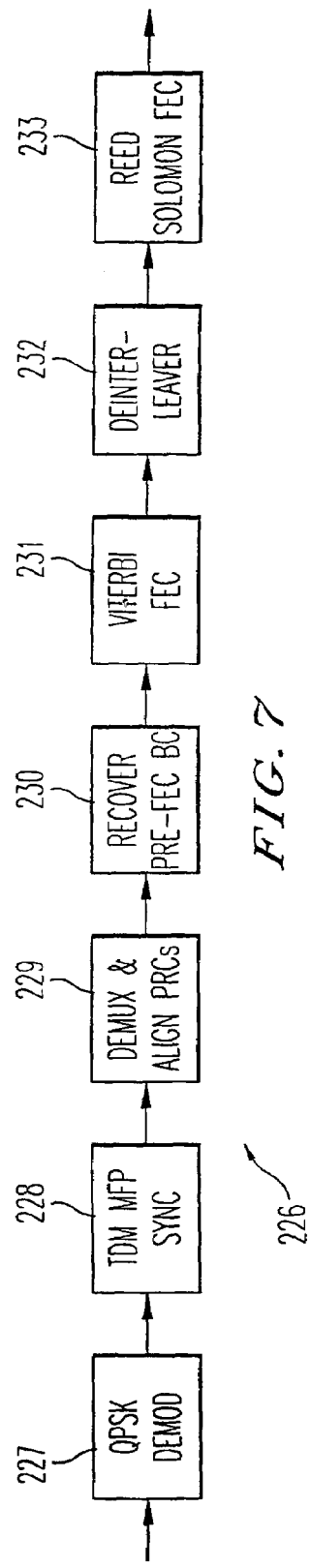
FIG. 7 is a block diagram illustrating QPSK TDM signal demodulation in accordance with an embodiment of the present invention.

For a two-arm receiver 14, as depicted in FIG. 6, the MCM signal is received as described with reference to FIG. 4. The QPSK modulated satellite TDM RF waveform is also received by the antenna 201 operating in conjunction with the low noise RF front end 202, a mixer 220, a local oscillator 221, a first IF 222, a second mixer 223, a second local oscillator 224, and a second IF 225, to recover the QPSK-modulated TDM carrier. As shown in FIG. 7, a QPSK TDM carrier demodulator 226 comprises a QPSK demodulator 227 which recovers the TDM digital baseband. The receiver 14 next synchronizes to the TDM masterframe frame preamble 228, demultiplexes and aligns the prime rate bits 229 and then recovers the bits of a selected broadcast channel. These bits are then forward error corrected 230 using the concatenation of a soft decision Viterbi decoder 231, a de-interleaver 232, and a Reed Solomon decoder 232, to recover the broadcast channel. This recovered BC is supplied as a second input to the decision/combiner unit 240.

The diversity combiner 240 selects which of the two input BCs is to be submitted for further processing. It does this based on selecting that BC which is recovered with the least errors. Estimates of the error counts are available from the soft decision data supplied by the Viterbi decoders 217 and 231 or the Reed Solomon decoders 219 and 233. The decision is preferably made with a hysterisis logic which requires that several errors of difference exist before the decision is reversed. This process is needed to prevent chattering between the two BCs when the decisions are nearly equally likely. The broadcast channel selected by the diversity combiner 240 is next supplied to the appropriate source decoder 244 to recover the service(s).

Figure 8:
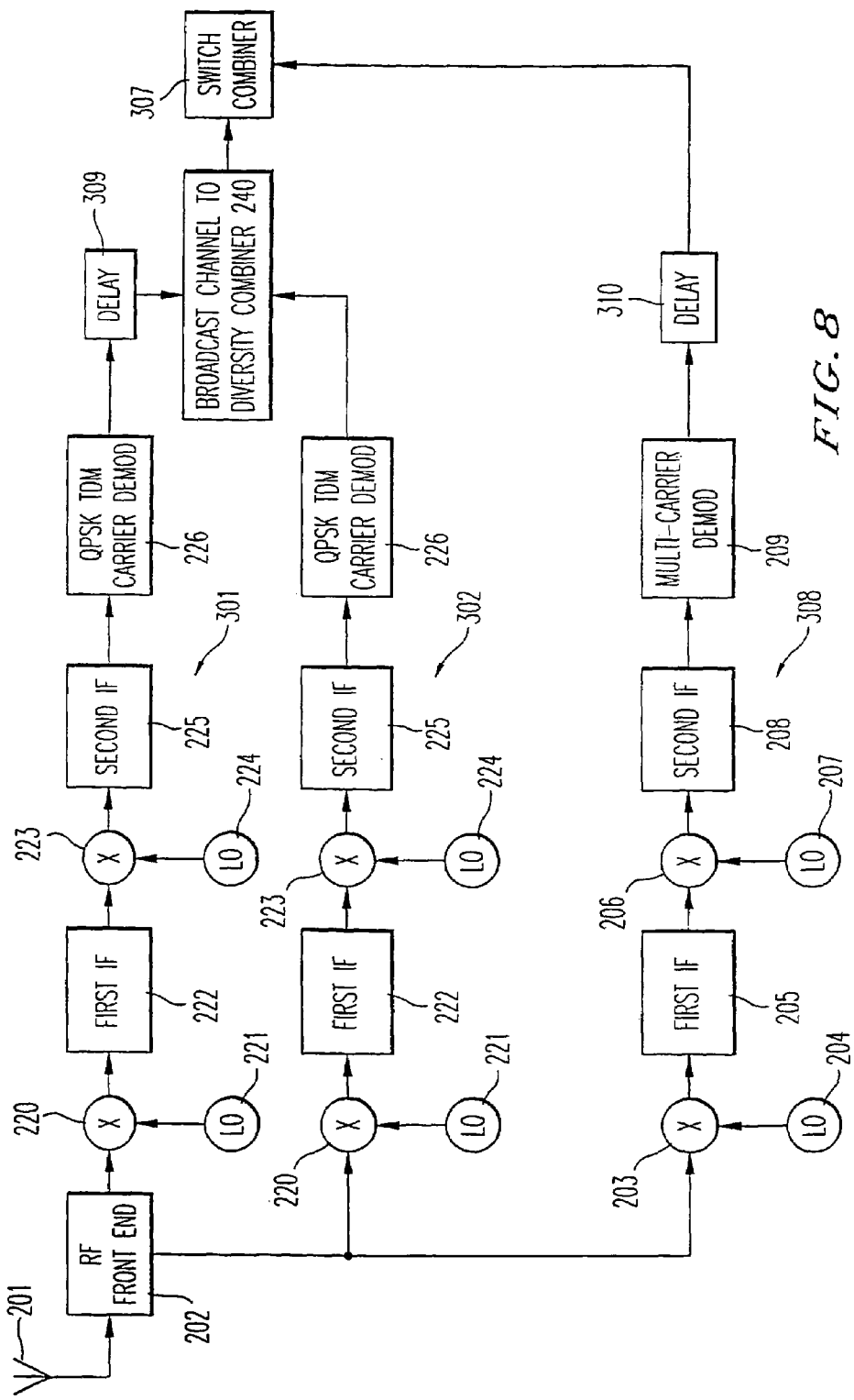
FIGS. 8 and 9 are schematic block diagrams illustrating respective embodiments of the present invention for diversity combining in a radio receiver.

The embodiment of the DBS 10 which uses two GSO satellites 12 and 16 with terrestrial repeater 18 is shown in FIG. 8. In this configuration, two satellites 12 and 16 are separated by between 30 degrees to 40 degrees longitude along the GSO circle. One satellite repeats a signal sent from a ground station, and the other satellite repeats the same signal sent from the same ground station but delays the signal as much as 5 to 10 seconds. The use of two satellites 12 and 16 separated in space results in elevation angle diversity in the LOS paths between a radio receiver 14 on the earth and each satellite 12 and 16. The time delay between the two satellite signal arrivals results in time diversity. Each of these types of diversity taken alone can significantly improve the availability of the LOS signal for a moving mobile receiver 14, and the improvement in availability is further significantly enhanced by both space and time diversity. Space and time diversity are particularly important when a mobile receiver 14 is traveling in a suburban area or in a rural area where the LOS signal blockage is due to bridges, trees and low buildings. However, for central city and metropolitan areas, where tall buildings abound, terrestrial re-radiation of the signal is also supplied in accordance with the present invention to achieve acceptable total area coverage for mobile reception. Thus, this two-satellite diversity configuration operates essentially the same way as the single satellite configuration with regard to the diversity between direct LOS satellite reception and terrestrial re-radiated reception, but adds the time and space diversity provided by the two satellites. The signal from the early satellite is the one re-radiated by the terrestrial repeater 18. Choice of the early signal allows any delay encountered in the signal processing at the repeater 18 or the receiver 14 to be absorbed. The terrestrial re-radiation network is otherwise implemented in the same way as previously described for the single satellite configuration.

Another difference between the two-satellite system and the one-satellite system resides in the three-arm radio receiver 14. The receiver 14 introduces appropriate compensating delays via delay units 309 and 310 to achieve simultaneous signal reception among the three received signals and implement a diversity decision logic which selects among the three diversity signals. The delay unit 309 provides a time diversity delay to the early signal to compensate for the signal propagation differential between the early and late satellites 12 and 16. The delay unit 310 is preferably a vernier delay to allow fine compensation for signal alignment. The radio receiver diversity logic design is shown in FIG. 8. It incorporates a maximum likelihood combiner 240 for the Early and Late LOS satellite signals with a switched combiner 307 between the terrestrial re-radiated signal and the output of the maximum likelihood combiner 240. When both signals are degraded, maximum-likelihood combining can improve the quality of reception. The improvement can be as much as 3 dB in terms of threshold $E_b/N_o$ when both signals are equally degraded.

Figure 9:
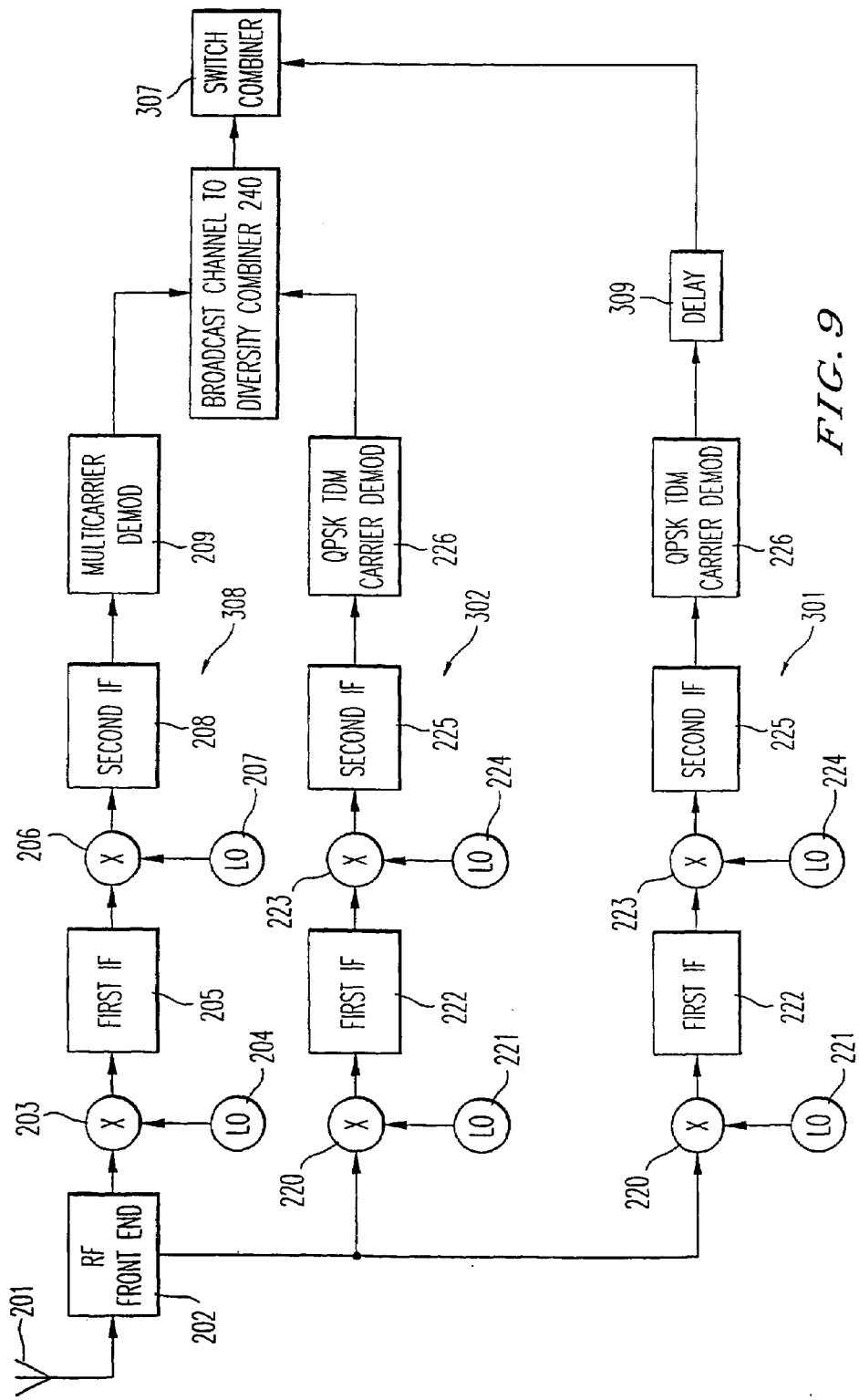

The radio receiver 14 is equipped with two receiver chains 301 and 302 that individually receive and recover the TDM signals from the early and late satellites, respectively, and selects a desired broadcast channel from each. This is done for each received signal in the same manner as previously described for LOS satellite reception in FIG. 6. Next, the broadcast channel signal derived from the early satellite is delayed by a delay unit 309 comprising a memory device to align it precisely, that is, symbol by symbol, with the symbols of the broadcast channel derived from the late satellite signal. This can be done by aligning the two broadcast channels relative to one another so as to cause coincidence of their service control header preamble correlation spikes. This coincidence is detected in a correlation comparitor unit in the delay unit 309. The next step is to use the maximum likelihood combiner 240 to combine the bits of the two broadcast channels, bit-by-bit, each bit expressed in soft decision form. The maximum likelihood combining coefficients are determined over 1 ms blocks of bits. Next, the output of the maximum likelihood combiner 240 is applied as one input to the switched combiner 307, with the other input coming from the terrestrial re-radiated signal receiver arm 308. The choice of which input is to be passed to the output is based on selecting that BC which is recovered with the least errors. In accordance with another embodiment of the present invention, one of the TDM signal receiver chains (e.g., receiver chain 302 for the late satellite TDM signal) can be maximum likelihood combined with the signal from the terrestrial re-radiated signal receiver arm 308, as shown in FIG. 9. Thus, the switched combiner 307 selects from between the output of the maximum likelihood combiner 240 and the other satellite signal receiver arm (e.g., arm 301), as shown in FIG. 9. The delay units 309 and 310 can be configured to store the entire recovered bit stream for delay purposes, which requires more buffering but simplifies combining. Alternatively, the delay units 309 and 310 can be configured to store only a portion of the recovered TDM bit stream; however, synchronization requirements for combining become more complicated.

With regard to switched combiner 307, estimates of the error counts are available from the soft decision data supplied by the Viterbi decoders 217 and 231 or the Reed Solomon decoders 219 and 233. The decision is made with a hysterisis logic which requires that several errors of difference exist before the decision is reversed. This process is prevents chattering between the two BCs when the decisions are nearly equally likely. Alternatively, a simple switching logic may be used in which the switch always favors the choice of the BC having the least errors. Hysterisis is used to prevent chattering. The latter implementation avoids the more complex maximum likelihood combining. Yet another alternative could be maximum likelihood combining of the three input BCs (e.g., from receiver arms 301, 302 and 308), as shown in FIG. 10.

Figure 10:
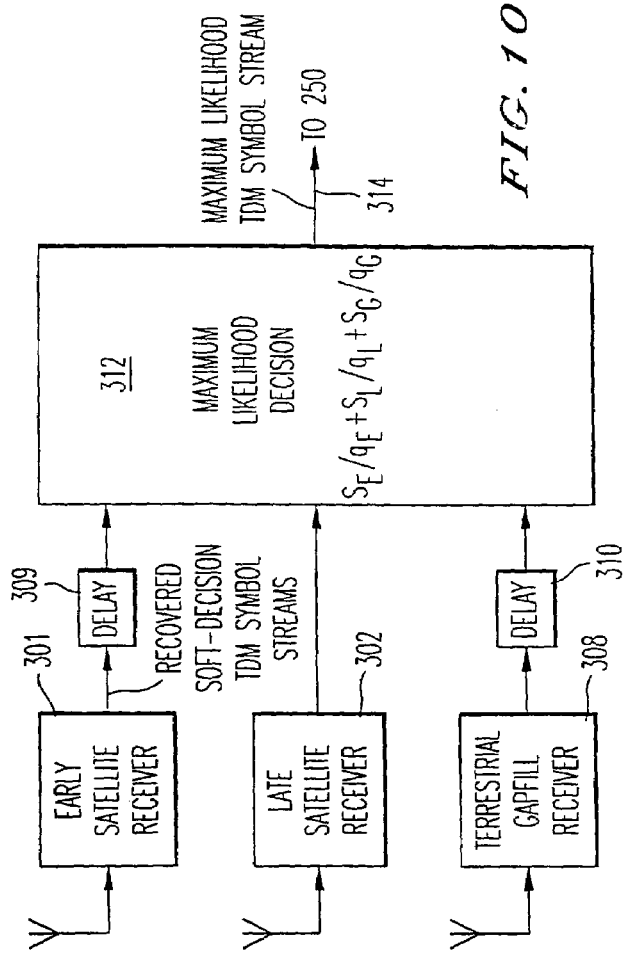
FIG. 10 illustrates a system of combining three diversity signals using a maximum likelihood decision unit in accordance with an embodiment of the present invention.
Figure 11:
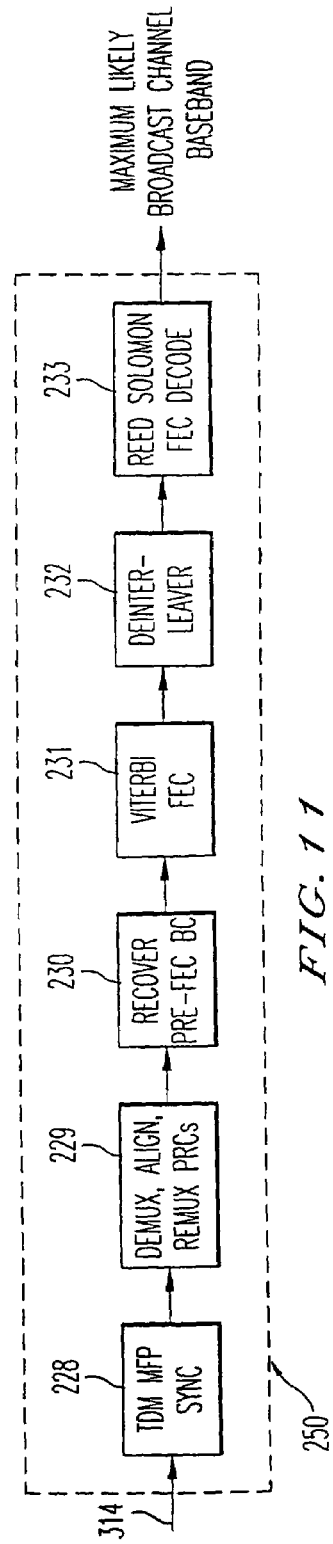
FIG. 11 is a schematic block diagram illustrating TDM signal demultiplexing in accordance with an embodiment of the present invention.

The diversity combiner shown in FIG. 10 combines three signals. Two are received from two spatially separated satellites 12 and 16, one broadcasting an early signal and the other broadcasting a late signal. The third signal is received from a terrestrial repeater 18 which rebroadcasts the early satellite signal. These signals are received by receiver arm 301 for the early satellite 12, receiver arm 302 for the late satellite 16 and receiver arm 308 for the early signal retransmitted by the repeater 18. The diversity combiner 312 combines the symbols in the three signals by maximum likelihood ratio combining. By this method, the samples of the symbol appearing at the output have the highest probability of representing the original transmitted symbol. To do this, the early satellite 12 and repeater 18 signals are delayed relative to the late satellite signal by delay units 309 and 310 to realign the individual symbols of the three signals causing them to be in time coincidence. Simple a priori adjustment of the delay units 309 and 310 suffices to coarsely align the output of the delay units 309 and 310 to within a TDM frame of 138 μs. Thus, fine alignment of the symbols to the master frame preamble (MFP) of a TDM frame is nonambiguous. To align the symbols of the three signals precisely, the MFPs for each signal stream are aligned by fine tuning the delay units 309 and 310 to within a small fraction of a symbol.

With continued reference to symbol combining in unit 312, the normalized variance $\sigma_x^2$ for the signal symbols, as contained in the background of noise, and uncorrelated multipath interference, is calculated from the observed samples. These variances are calculated for the early (E), late (L) and repeater 18 or gap-filler (G) signal symbols. The respective signal samples of the symbols for the early, late and gap-filler signals are then multiplexed by their variance ratios $(q_E)^{-1}$, $(q_L)^{-1}$ and $(q_G)^{-1}$, which are defined as follows:

$(q_E)^{-1}$ is the weighting factor associated with early symbol $S_E$ $(q_L)^{-1}$ is the weighting factor associated with early symbol $S_L$ $(q_G)^{-1}$ is the weighting factor associated with early symbol $S_G$ The weighting factors are inversely proportional to the estimated variance and are normalized such that $q_E + q_L + q_G = 1$ $q_E = \sigma_E^2 / (\sigma_E^2 + \sigma_L^2 + \sigma_G^2)$ $q_L = \sigma_L^2 / (\sigma_E^2 + \sigma_L^2 + \sigma_G^2)$ $q_G = \sigma_G^2 / (\sigma_E^2 + \sigma_L^2 + \sigma_G^2)$ Their sum constitutes the maximum likelihood ratio combined symbols. These are then passed on to the time demultiplexer/FEC decoder/BC remultiplexer unit 250 (FIG. 11), the components of which have previously been described above in connection with FIG. 5, to recover the maximum likelihood ratio combined symbols by decision processing.

Figure 12:
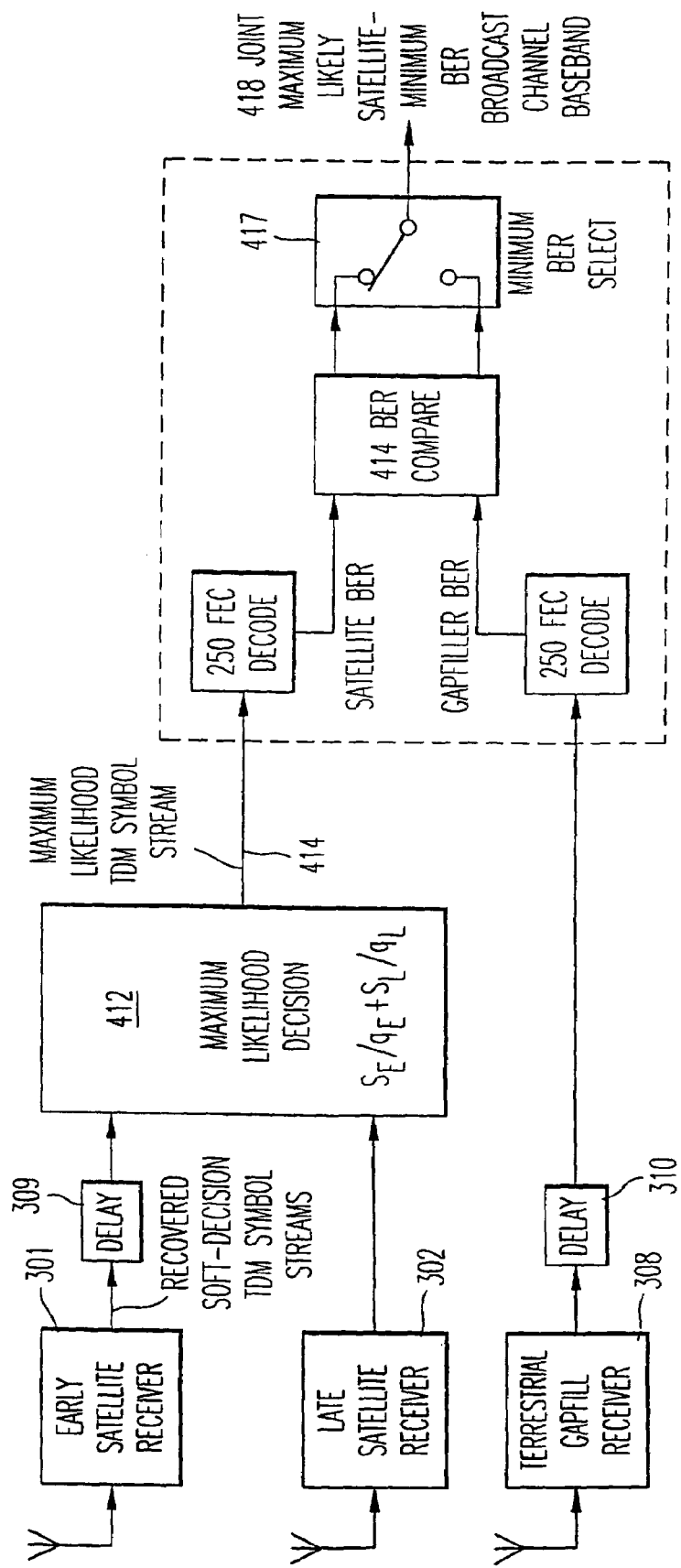
FIG. 12 illustrates a system of combining bit streams recovered at a radio receiver using a maximum likelihood decision unit on a first satellite signal and a delayed second satellite signal and then a diversity combiner for terrestrial repeater signal and the output of the maximum likelihood decision unit in accordance with an embodiment of the present invention.

The diversity combiner shown in FIG. 12 first combines signals received from two satellites 12 and 16, one broadcasting an early signal and the other broadcasting a late signal. The result of this is next combined by minimum bit error decision with reception of the early signal that has been retransmitted by a gap-filler repeater 18 located on the ground. The individual signals are received by the receiver arm 301 for the early satellite, the receiver arm 302 for the late satellite and the receiver arm 308 for the early signal retransmitted by the gap-filler repeater 18. The maximum likelihood ratio diversity combiner 412 combines the symbols of the early and late satellite signals in the same manner described above in connection with combiner 312 in FIG. 10 for three signals. By this method, the final symbol appearing at the output of unit 412 has the highest probability of representing the original transmitted symbol.

The result from unit 412 is next combined with that from the terrestrial repeater 18 by minimum BER select unit 417. Within the unit 417, there are preferably two units 250 that make FEC-decoded symbol decisions for an entire broadcast channel frame of the signals applied at their inputs. One unit 250 makes its decisions on the output from maximum likelihood decision unit 412, and the other unit 250 from the signal received from the terrestrial repeater 18. These decisions also provide the number of errors made with each decision observed over the duration of a broadcast frame. A BER compare unit 414 operates in conjunction with a minimum BER select unit 417 to select the symbols of that broadcast frame with the least error, as determined from inputs from Viterbi FEC units 217 and 231. To implement the necessary delay operations, the early and gap-filler signals are delayed by delay units 309 and 310 to realign their individual symbols to be in symbol time coincidence with the symbols received from the late satellite. The delay alignment method used here is the same as that described for the implementation of FIG. 10.

Figure 13:
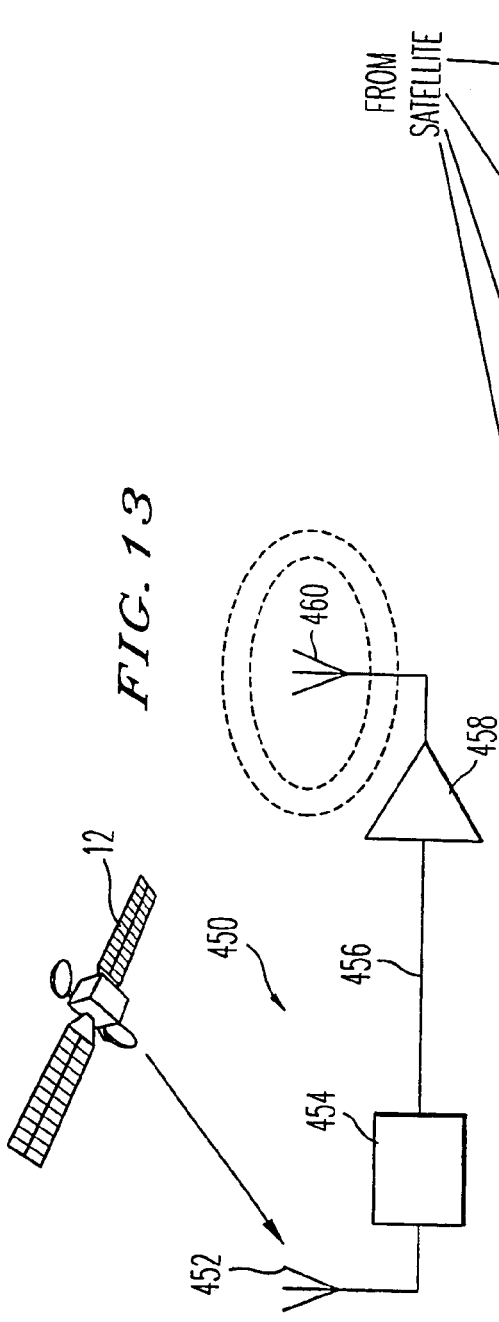
FIG. 13 illustrates an arrangement for indoor reception of a broadcast signal in accordance with an embodiment of the present invention.

In accordance with another aspect of the present invention, an indoor re-radiation system 450 is provided which is illustrated in FIG. 13. Since LOS reception of a satellite signal at a radio receiver located inside a building or other structure is generally not available, unless the radio receiver 14 is located at a window in LOS of the satellite 12 or 16, indoor reinforcement of satellite signals for more complete coverage.

As shown in FIG. 13, an antenna 452 can be located externally with respect to a building so as to achieve LOS reception of satellite signals. A tuned RF front-end unit 454 is connected to the antenna 452 and is preferably configured to select the portion of the RF spectrum that contains the essential frequency content of the satellite signal and by doing so with very low added noise. An interconnecting cable 456 is provided to supply the signal at the output of the tuned RF front-end unit 454 to an amplifier 458. The amplifier 458 is connected to a re-radiating antenna 460 located within the building.

The amplifier 458 is configured to increase the power of the satellite signal to a level that, when re-radiated, by the antenna 460, is sufficient to permit satisfactory indoor reception for a radio receiver. The power level radiated from the antenna 460 is sufficiently high to achieve satisfactory indoor reception at locations which are not in the LOS of the satellite, but not so high as to cause instability by signals returned by the path between the indoor antenna 460 and one or more of the receiving antennas 452. Thus, high isolation (i.e., on the order of 70–80 dB) is preferred between the indoor antenna 466 and the outdoor antenna 452.

Reception areas will be present (e.g., through windows or other openings to the building or structure) where indoor re-radiated signals combine with an outdoor signal transmitted directly from the satellite. To assure that the combination of these signals does not occur in an manner which is destructive to signal content, the time delay between an outdoor signal and an indoor signal in the region of combination is preferably less than a fraction of the symbol width of the signal being transmitted. For example, for a symbol width of approximately 540 nanoseconds, a time delay between 50 and 100 nanoseconds can be tolerated. The time delay is generally due to the time required for a signal to travel the path comprising the outdoor antenna 452, the cable (where signals generally travel at two-thirds the speed of light), and onward to the indoor antenna 460. Another delay occurs as the signal travels from the indoor antenna 460 to the radio receiver 14 in an area covered by the indoor antenna. This time delay is preferably only 20% of the symbol width, that is, not more than 100 nanoseconds for a system in which the symbol width is 540 nanoseconds.

Figure 14:
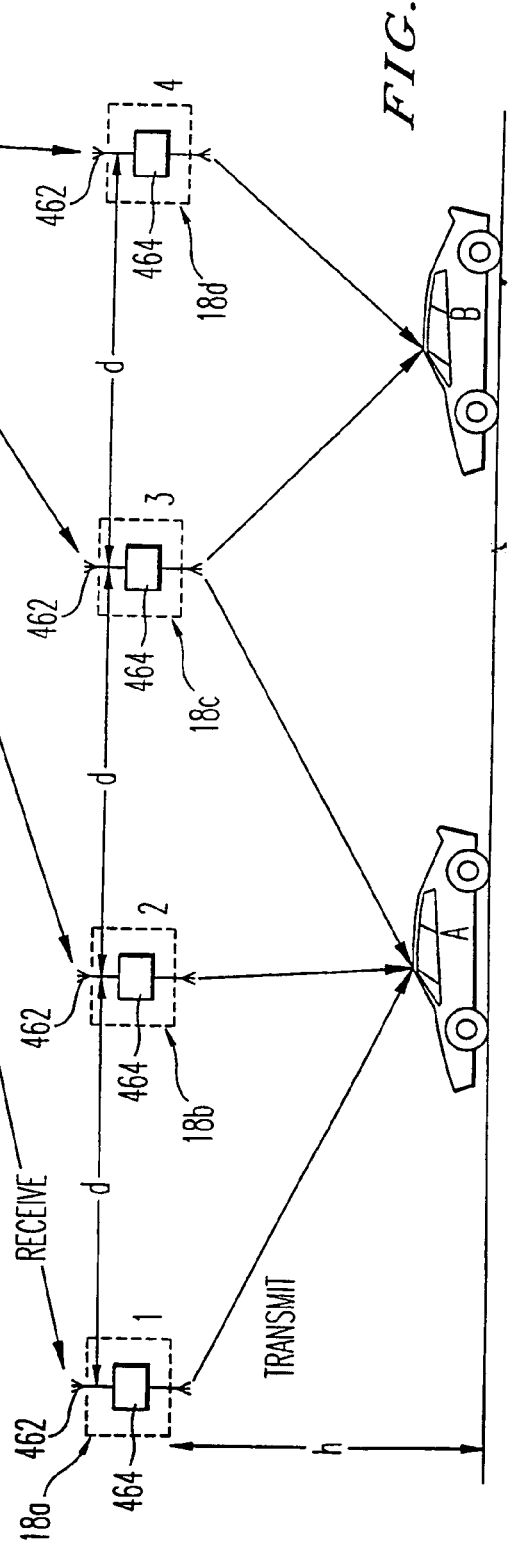
FIG. 14 illustrates an arrangement for terrestrial repeaters along a path in accordance with an embodiment of the present invention.

The purpose of a terrestrial repeater is to repeat a signal received from the satellite into areas where the signal is otherwise blocked. A multiplicity of these terrestrial repeaters 18 may be placed along a roadway or other path at a height h and separated by distances d, as shown in FIG. 14. The heights and separation distances between the terrestrial repeaters need not be equal. A terrestrial repeater 18 comprises a receive antenna 462 that is pointed at the satellite 12 or 16, a receiver (not shown) that recovers the signal and amplifies it with a gain that is sufficient to drive a transmit antenna 464 such as to a power flux density in the path below which is comparative to that normally expected from the satellite. The transmit antenna 464 is shielded so as to prevent the transmitted signal from reaching the terrestrial repeater receive antenna 462 at a level sufficient to create instability. The transmit antenna 464 radiates its power over an aperture of length L sufficient to cause path length diversity over several wavelengths between the transmitter 464 and the vehicle's receive antenna at the carrier frequency.

As a vehicle drives along the path, the radio receiver 14 therein receives signals coming from more than one terrestrial repeater 18. For example, in position A, a vehicle is nearest to terrestrial repeater 18b and that terrestrial repeater's signal dominates and be responsible for reception. Signals from terrestrial repeaters 18a and 18b are low because of distance and antenna pattern and cause little interference. If the vehicle is at position B, the radio receiver 14 therein receives signals from both terrestrial repeaters 18c and 18d. Since the distances are nearly equal, and assuming that the time difference between signals radiated from terrestrial repeaters 3 and 4 is adjusted to zero, the time difference of arrival between the signals received at the vehicle are sufficiently small so as to cause constructive reinforcement. By proper choice of the distances h and d in relationship with the symbol period of the digital signal being received, this condition can be achieved.

It is important to cause diversity in the signals that arrive at the vehicle from the different terrestrial repeaters. If this is not done, then the signals from two terrestrial repeaters, as would be received in the location B, would combine alternately in-phase and out-of-phase and phases in between. When they are in phase, the signals reinforce, and when out-of-phase the signals cancel. When signal cancellation occurs, the signal is completely lost. In addition, the resulting carrier phase of the signal created by addition of the terrestrial repeater carriers rotates at a rate equal to a nearly monochromatic Doppler difference, making it difficult to recover the QPSK modulation. The spread in arrival times caused by the diversity transmission resulting from distribution of the transmitted signal over the aperture L, or over an equivalent time difference of L/C where C=speed of light, eliminates the amplitude cancellation and provides the possibility of correcting the impact of the phase rotation by application of adaptive equalization techniques. This applied to all vehicle locations between locations A and B.

An example of the proper choice of distances in relationship to symbol period is seen by considering a signal having a symbol period on the order of 540 to 550 nanoseconds. The spacing d and height h is selected so as to cause the time delay in transversing the slant distance $(d^2+h^2)^{1/2}$ to cause a delay of no greater than a quarter of a symbol period. In this example, the slant distance is 550/d=137.5 ft. One nanosecond is equivalent to one foot at the speed of light. Thus, if the height is 20 feet, the distance d is 180 feet. The height h is preferably relatively small when compared to distance d so as to cause the difference in distance between the vehicle and each terrestrial repeater 18 to change by an amount sufficient to assure that the signal level from any one terrestrial repeater is attenuated by 10 dB or more compared to that from a terrestrial repeater immediately overhead. The length L is preferably between 5 to 10 feet to provide sufficient path length diversity at L-band frequencies. If an equalizer unit is incorporated in the vehicle's mobile receiver 14, the time difference in arrival can be extended to several symbols, thus increasing the distance between the terrestrial repeaters to over 1000 feet. An equivalent time difference would be to transmit the signal several times from the same source over a spread not exceeding 5–10 nanoseconds.

While various embodiments have been chosen to illustrate the invention, it will be understood by those skilled in the art that various changes and modifications can be made therein without departing from the scope of the invention as defined in the appended claims.

What is claimed is:

1. A method for converting a time division multiplexed bit stream into a plurality of multicarrier modulated signals at a terrestrial repeater, comprising the steps of:
   receiving said time division multiplexed bit stream from a satellite;
   dividing said time division multiplexed bit stream into a plurality of parallel bit paths;
   representing each of a predetermined number of bits in each of said plurality of bit paths as a symbol comprising an imaginary component and a real component;
   providing said symbols to parallel inputs of an inverse Fourier transform converter as complex number frequency coefficient inputs to generate outputs which comprise modulated, narrow-band, orthogonal carriers; and
   transmitting said modulated, narrow-band, orthogonal carriers from said terrestrial repeater.

2. A method as claimed in claim 1, further comprising the step of generating a guard interval for said carriers.

3. A method as claimed in claim 2, wherein said generating step comprises the steps of:

allocating a fraction of the symbol period corresponding to the duration of each of said symbols to guard time; and reducing the duration of each of said symbols.

4. A method as claimed in claim 3, wherein said reducing step comprises the steps of:

storing said outputs of said inverse Fourier transform converter in a memory device every said symbol period; and reading from said memory device after each said fraction of said symbol period has elapsed.

5. A method as claimed in claim 2, wherein said generating step further comprises the step of filling said guard interval with a subset of said outputs of said inverse Fourier transform.

6. A method as claimed in claim 1, further comprising the step of inserting a synchronization symbol every predetermined number of said symbol periods to synchronize a sampling window corresponding to said fraction of said symbol period with respect to said carriers every said symbol period at a receiver for said plurality of multicarrier modulated signals.

7. A method as claimed in claim 1, further comprising the step of puncturing said time division multiplexed bit stream to reduce the total bandwidth associated with said carriers.

8. A method as claimed in claim 7, wherein said puncturing step comprises the step of selectively eliminating bits from said time division multiplexed bit stream prior to providing said symbols to parallel inputs of an inverse Fourier transform converter.

9. A receiver for receiving a broadcast signal in a combined satellite and terrestrial digital broadcasting system, comprising:

a first receiver arm for receiving a first satellite signal transmitted from a first satellite on a first carrier frequency, said first satellite signal comprising said broadcast signal and being modulated in accordance with at least one of time division multiplexing and code division multiplexing, said first receiver arm comprising a demodulator for recovering said broadcast signal;

a second receiver arm for receiving a terrestrial signal transmitted from a terrestrial station on a second carrier frequency, said terrestrial signal comprising said broadcast signal and being modulated in accordance with at least one of adaptive equalized time division multiplexing, coherent frequency hopping adaptive equalized time division multiplexing, code division multiplexing and multicarrier modulation, said second receiver arm comprising a demodulator for recovering said broadcast signal; and a combiner for generating an output signal from at least one of said first satellite signal and said terrestrial signal.

10. A receiver as claimed in claim 9, further comprising:

a third receiver arm for receiving a second satellite signal from a second satellite that is delayed with respect to said first satellite signal in accordance with a selected time delay, said second satellite signal comprising said broadcast signal and being modulated in accordance with the corresponding at least one of time division multiplexing and code division multiplexing employed by said first satellite signal, said third receiver arm comprising a demodulator for recovering said broadcast signal; and a delay device for delaying said first satellite signal in accordance with said selected time delay, said combiner generating an output signal from at least one of said first satellite signal, said second satellite signal and said terrestrial signal.

11. A method of transmitting a broadcast signal to a radio receiver, comprising the steps of:

modulating said broadcast signal for transmission to said radio receiver as a first signal in accordance with at least one of time division multiplexing and code division multiplexing;

transmitting said first signal to said radio receiver from a first satellite on a first carrier frequency;

modulating said broadcast signal at a terrestrial station for transmission to said radio receiver as a second signal in accordance with at least one of adaptive equalized time division multiplexing, coherent frequency hopping adaptive equalized time division multiplexing, code division multiplexing, and multicarrier modulation; and transmitting said second signal to said radio receiver from said terrestrial station on a second carrier frequency that is different from said first carrier frequency.

12. A method as claimed in claim 11, wherein said step of modulating said broadcast signal as said second signal comprises the steps of:

receiving said first signal at said terrestrial station; and performing baseband processing of said first signal prior to modulating in accordance with at least one of adaptive equalized time division multiplexing, coherent frequency hopping adaptive equalized time division multiplexing, code division multiplexing, and multicarrier modulation.

13. A method as claimed in claim 12, further comprising the step of receiving said first signal and said second signal using at said radio receiver.

14. A method as claimed in claim 13, further comprising the step of demodulating each of said first signal and said received second signal to remove said respective modulations and to recover a first recovered broadcast signal and a second recovered broadcast signal, respectively.

15. A method as claimed in claim 14, further comprising the steps of generating an output broadcast signal from said first recovered broadcast signal and said second recovered broadcast signal.

16. A method as claimed in claim 15, wherein said generating step comprises the step of performing maximum likelihood combining of said first recovered broadcast signal and said second recovered broadcast signal.

17. A method as claimed in claim 11, further comprising the steps of:

modulating a broadcast signal for transmission to said radio receiver as a third signal in accordance with at least one of time division multiplexing and code division multiplexing;

transmitting said third signal to said radio receiver from a second satellite, said transmission being delayed with respect to the transmission of said first signal by a predetermined period of time.

18. A method as claimed in claim 17, further comprising the steps of:

receiving said first signal, said second signal and said third signal at said radio receiver;

demodulating each of said first signal, said second signal and said third signal to remove said respective modulations and to recover a first recovered broadcast signal, a second recovered broadcast signal and a third recovered broadcast signal, respectively; and generating an output broadcast signal from at least one of said first recovered broadcast signal, said second recovered broadcast signal and said third recovered broadcast signal.

19. A digital broadcasting system for transmitting a broadcast signal, said broadcast signal being transmitted from an earth station, comprising:
- a satellite for receiving said broadcast signal from said earth station and for transmitting a satellite signal comprising said broadcast signal on a first carrier frequency; and
- a terrestrial repeater for receiving said satellite signal and for generating and transmitting a terrestrial signal from said satellite signal comprising said broadcast signal on a second carrier frequency that is different from said first carrier frequency, said terrestrial signal being modulated by said terrestrial repeater in accordance with a multipath-tolerant modulation technique;
- wherein said terrestrial repeater is operable to modulate said terrestrial signal using multicarrier modulation; and
- said terrestrial repeater to operable to receive said satellite signal and to demodulate said satellite signal into a baseband signal prior to modulating said baseband signal using multicarrier modulation.

20. A digital broadcasting system for transmitting a broadcast signal, said broadcast signal being transmitted from an earth station, comprising:
- a satellite for receiving said broadcast signal from said earth station and for transmitting a satellite signal comprising said broadcast signal on a first carrier frequency;
- a terrestrial repeater for receiving said satellite signal and for generating and transmitting a terrestrial signal from said satellite signal comprising said broadcast signal on a second carrier frequency that is different from said first carrier frequency, said terrestrial signal being modulated by said terrestrial repeater in accordance with a multipath-tolerant modulation technique; and
- a second satellite operable to receive said broadcast program from said earth station and to transmit a second satellite signal comprising said broadcast signal on said first carrier frequency and delayed a predetermined period of time with respect to the transmission of the first satellite signal.

21. A terrestrial repeater for retransmitting satellite signals to radio receivers, comprising:
- a terrestrial receiver for receiving said satellite signals; and
- a terrestrial waveform modulator for generating terrestrial signals from said satellite signals, said terrestrial signals being modulated by said terrestrial waveform modulator in accordance with multicarrier modulation;
- wherein said satellite signals are transmitted from a satellite using a first carrier frequency, and said terrestrial waveform modulator is operable to transmit said terrestrial signals to said radio receivers using a second carrier frequency that is different from said first carrier frequency; and
- wherein said terrestrial waveform modulator comprises
- a time division demultiplexer for demultiplexing said satellite signals from a serial time division multiplexed bit stream into a plurality of parallel bit streams; and
- an inverse fast Fourier transform device for generating a digital analog signal comprising a plurality of discrete Fourier transform coefficients.

22. A digital broadcasting system for transmitting a broadcast signal, said broadcast signal being transmitted from an earth station, comprising:
- a first satellite configured to receive said broadcast program from said earth station and to transmit a time division multiplexed satellite signal comprising said broadcast signal;
- a terrestrial repeater configured to receive said satellite signal and to generate and transmit a terrestrial signal from said satellite signal comprising said broadcast signal, said terrestrial signal being modulated by said terrestrial repeater in accordance with at least one of adaptive equalized time division multiplexing, coherent frequency hopping adaptive equalized time division multiplexing, code division multiplexing and multicarrier modulation; and
- at least one radio receiver configured to receive said satellite signal and said terrestrial signal, said radio receiver comprising a diversity combiner for generating an output signal from at least one of said satellite signal and said terrestrial signal.

23. A digital broadcasting system as claimed in claim 22, further comprising a second satellite configured to receive said broadcast signal from said earth station and to transmit a second time division multiplexed satellite signal comprising said broadcast signal, said second satellite signal being delayed with respect to said first satellite signal by a selected time delay.

24. A digital broadcasting system as claimed in claim 23, further comprising at least one radio receiver configured to receive said first satellite signal, said second satellite signal and said terrestrial signal, to delay at least one of said first satellite signal and said terrestrial signal in accordance with said selected time delay, and to generate an output signal from at least one of said first satellite signal, said second satellite signal and said terrestrial signal.

25. A digital broadcasting system as claimed in claim 24, wherein said radio receiver comprises a diversity combiner and a switched combiner, said radio receiver using said diversity combiner to perform maximum likelihood decision combining of said first satellite signal and said second satellite signal and said switch combiner to select between the output of said diversity combiner and said terrestrial signal depending on which of said output of said diversity combiner and said terrestrial signal has the least number of bit errors.

26. A digital broadcasting system as claimed in claim 24, wherein said radio receiver comprises a diversity combiner to perform maximum likelihood decision combining of said first satellite signal, said second satellite signal and said terrestrial signal.

* * * * *

UNITED STATES PATENT AND TRADEMARK OFFICE
CERTIFICATE OF CORRECTION

PATENT NO.        : 6,944,139 B1
APPLICATION NO.   : 09/647007
DATED             : September 13, 2005
INVENTOR(S)       : S. Joseph Campanella It is certified that error appears in the above-identified patent and that said Letters Patent is hereby corrected as shown below:

Item (73) Assignee:
Please change the Assignee's Name on the Title Page of the Letters Patent as follows:

--WorldSpace Corporation, Silver Spring, MD. --.

Signed and Sealed this

Twelfth Day of December, 2006

JON W. DUDAS
*Director of the United States Patent and Trademark Office*